United States Patent [19]

Brenski et al.

[11] Patent Number: 5,384,823
[45] Date of Patent: Jan. 24, 1995

[54] TELECOMMUNICATIONS SWITCH WITH INTEGRAL FEATURE INSTALLATION CAPABILITY

[75] Inventors: Edwin F. Brenski, Batavia; Dhaval C. Patel, Naperville; Richard M. Rovnyak, Sr., Schaumburg, all of Ill.

[73] Assignee: AT&T Corp., Murray Hill, N.J.

[21] Appl. No.: 23,236

[22] Filed: Feb. 25, 1993

[51] Int. Cl.6 .................... H04M 1/24; H04M 3/08; H04J 1/16
[52] U.S. Cl. ...................... 379/10; 379/15; 379/16; 379/17; 370/14
[58] Field of Search ............... 379/10, 15, 11, 12, 379/14, 16, 18, 201, 246; 370/14, 16, 110.1

[56] References Cited

U.S. PATENT DOCUMENTS

| | | | |
|---|---|---|---|
| 3,995,118 | 11/1976 | Chao | 179/15 |
| 4,238,649 | 12/1980 | Kemler | 379/14 X |
| 4,680,784 | 7/1987 | Lehnert et al. | 379/11 |
| 4,897,866 | 1/1990 | Majmudar et al. | 379/94 |
| 4,945,554 | 7/1990 | Krause et al. | 275/15 X |
| 4,959,856 | 9/1990 | Bischoff et al. | 379/246 X |
| 5,065,422 | 11/1991 | Ishikawa | 375/18 X |
| 5,241,580 | 8/1993 | Babson, III | 379/10 X |

Primary Examiner—Stephen Chin
Assistant Examiner—Paul Loomis
Attorney, Agent, or Firm—Charles L. Warren

[57] ABSTRACT

The operating system control device in a telecommunications switch is capable of operating under the control of software instructions associated with a new switch feature for executing a series of actions used to integrate the new switch feature with the operating system. The operating system control device further provides the capability operating under the control of software instructions for testing the operability of the new switch feature. This minimizes the costs associated with the installation of new features and the amount of skilled craft personnel time required.

12 Claims, 3 Drawing Sheets

TELECOMMUNICATIONS SWITCH WITH INTEGRAL FEATURE INSTALLATION CAPABILITY

BACKGROUND OF THE INVENTION

The present invention is directed to electronic telecommunication switches and more specifically to the initial installation of a switch and the installation of new switch features which may involve additional programs, hardware, or both.

Modem electronic telecommunication switches are versatile. Such switches can be configured to provide a variety of features and functions based on the needs of a service provider such as an telephone company. Many features are supposed by a combination of hardware and software. Because the switches are so versatile, installing a new feature and especially the initial installation of a switch in a first time application has typically required substantial support from skilled installers often referred to as craft personnel.

The costs involved in installing a switch may comprise a substantial fraction of the overall costs associated with the purchase of the switch. Because of the magnitude of hardware and software involved in an installation and because of the relatively high labor costs associated with using skilled craft personnel, switch installations are costly. Switch manufacturers provide detailed installation documentation involving both the installation of hardware and software. Following such detailed written documentation can be tedious and time consuming. In response to the desire by the switch purchaser to get the switch up and running (or the new feature operational), craft personnel may be tempted to rush through the recommended procedures or not follow some of the recommended steps or tests. This can lead to problems that are difficult to resolve.

Although a number of tests are recommended to be made during the installation of a switch or a new feature, most of the tests and installation procedures are manually implemented by craft personnel. Test results are often monitored on a printer connected to the switch to provide the craft personnel with a listing of parameters and performance checks made during the test. Manual review of such output is time consuming and makes error detection and analysis time consuming. Thus, there exists a need for an improved telecommunications switch which minimizes installation time and costs by automating installation procedures and tests.

SUMMARY OF THE INVENTION

It is an object of the present invention to provide an improved telecommunications switch which automates installation processes and tests thereby minimizing the installation costs and the amount of support needed from craft personnel.

In accordance with an embodiment of the present invention, a telecommunications switch multiplexes information carried by subscriber lines into corresponding digital communication channels and establishes communication paths between pairs of the channels. The switch includes an administration module which provides operating system control of the switch based on software instructions. Operating under control of software instructions associated with a new switch feature to be installed, the administration module executes a series of actions used to integrate the new switch feature with the existing operating system. Also operating under the control of software instructions included in the administrative module, the operability of the new switch feature is tested.

If it is determined that switch elements which are required to support the new switch feature are not operational or available, a prompt will be given to an installer identifying the elements which are to be installed so that the implementation of the new switch feature can be completed. Thus, the present invention seeks to minimize the costs involved with installation of a switch or a new feature in a telecommunications switch. Since a substantial portion of the installation is automated in accordance with the present invention, increased quality should result.

BRIEF DESCRIPTION OF THE DRAWING'S

DETAILED DESCRIPTION

Figure 1:
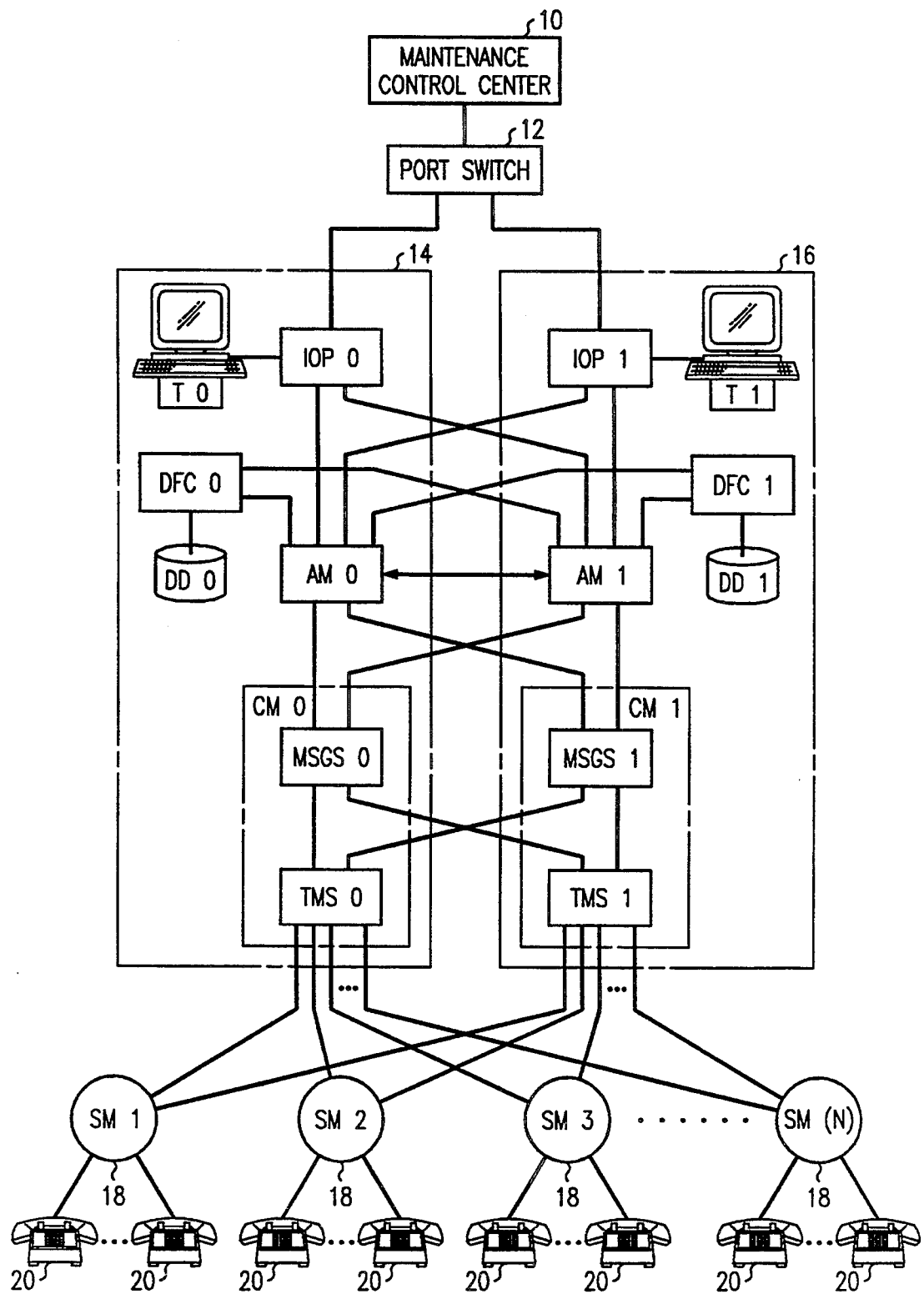
FIG. 1 is a block diagram of a telecommunications system that includes a telecommunications switch in accordance with the present invention.

FIG. 1 illustrates a telecommunication system which includes a telecommunications switch in accordance with the present invention. The switch includes a maintenance control center 10 which is coupled by port switch 12 to switching arrangements 14 and 16, and service modules (SM) 18 which support a plurality of customer premises equipment (CPE) 20 illustrated as telephones. A basic service provided by the telecommunications switch is the ability to provide a communication path between a calling party associated with one CPE 20 to a called party associated with a different CPE 20. The telecommunications switch is also coupled to other telecommunications switches by a communication network for providing communications between users supported by different switches.

In accordance with this illustrative example, an embodiment of the present invention is incorporated in a telecommunications switch such as an AT&T 5ESS ® switch. The maintenance control center 10 may consist of a personal computer and provides a mechanism for sending instructions to and receiving output from the switching arrangements 14 and 16. The port switch 12 permits the maintenance control center 10 to selectively communicate with either arrangement.

In normal operation only one of switching arrangements 14 and 16 will be active while the other arrangement provides a backup or standby capability in the case of a failure in the active arrangement. The arrangement in the standby mode can be activated and the previously active arrangement changed to standby in the case of a failure or for maintenance. It will also be understood that a backup capability can be provided on an element-to-element basis as well as on a total arrangement basis. The following explanation of switching arrangement 14 applies to the corresponding mirror elements and functions provided by switching arrangement 16.

Switching arrangement 14 includes a terminal T0 which can provide instructions to and receive output from administration module AM0 and AM1 via input/output port IOP0. The IOP0 also supports coupling AM0 and AM1 via port switch 12 to maintenance control center 10. The administration module AM0 provides operation, administration and maintenance control for communication module CM0 and the switch modules (SM's) 18. The administration module includes a computer architecture including central processing unit, read-only memory, random access memory and input/output ports. Operating system software utilized by the AM is loaded from a disk drive element DD0 via a disk file controller DFC0. Thus, the administration module provides operating system control for the telecommunications switch.

A communications module CM0 provides a space switching function in the known time-space-time switch architecture. Communications module CM0 includes a message switch MSGS0 which is coupled to AM0 and to a time multiplexed switch TMS0. The time multiplexed switch TMS0 establishes communication paths between the SM's and AM0 and between different SM's. Each SM 18 multiplexes information carried by individual subscriber lines associated with CPE 20 into corresponding digital communication channels which are time division multiplexed. Each of these multiplexed channels is transmitted to the time multiplexed switch TMS0 which establishes a communication path with another time division multiplexed channel associated with another subscriber with which communication is desired. The message switch MSGS0 provides switching of operational messages and instructions within the telecommunications switch to control the routing and switching of calls and other switch operations. The general structure of such a telecommunications switch such as an AT&T 5ESS switch is generally known.

The elements in switch arrangement 16 provide the same functions as described with regard to the corresponding elements in switch arrangement 14. It will also be noted that a cross coupling exists between like elements in the switch arrangements with below elements in the other arrangement. This coupling structure allows the flexibility of substituting the required functionality of one element with that of the other like element.

The overall operational system responsibilities controlled by the administration module will make it apparent that the control modules and switch modules must function with each other and with the administration module in order to maintain compatibility and organization in the telecommunications switch. Therefore, when a new switch feature is to be implemented, care must be utilized to insure that the software and hardware parameters and elements required by the feature are available. It is also important that the feature be properly integrated into the existing operational system of the switch so that the overall operation of the switch is not adversely affected. As used herein, a new switch feature means an additional service capability to be added to the switch which involves new software instructions and typically also involves new hardware elements.

In accordance with the illustrative embodiment of the present invention, software instructions relating to the installation and integration of new features are preferably contained in the administration module. The administration module operating under the control of these instructions execute a series of actions which are utilized to integrate a new switch feature with the existing operating system. The administration module also includes software instructions associated with a new switch feature for testing the operability of a new switch feature. The ability of the administration module, i.e. the telecommunications switch itself, to integrate and test new switch features minimizes the amount of manual support required from skilled craft personnel and minimizes the probability of errors in the installation of a new feature because of increased process control.

Figure 2:
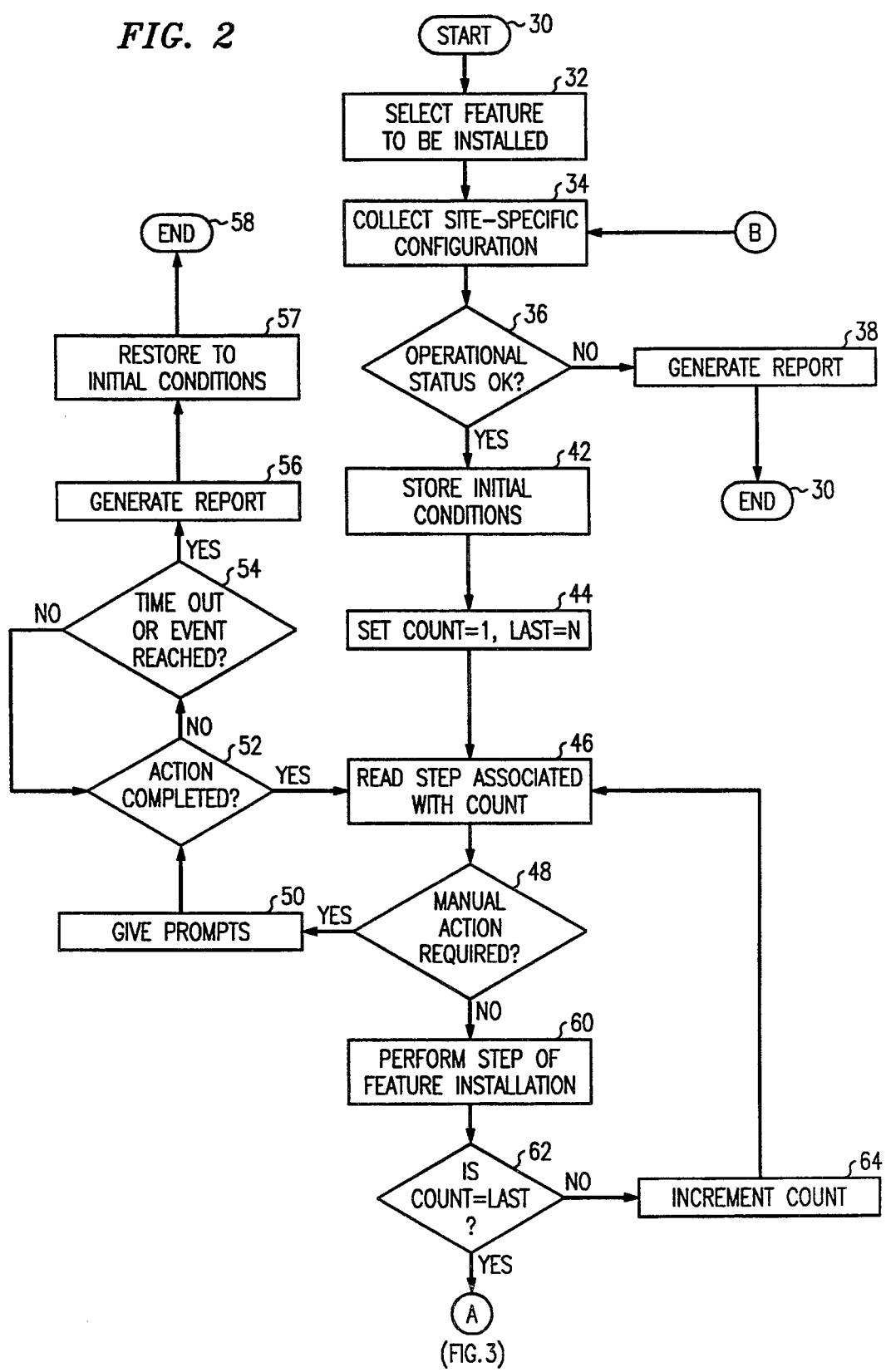
FIGS. 2 and 3 are flow diagrams illustrating steps for carrying out an exemplary method in accordance with the present invention.
Figure 3:
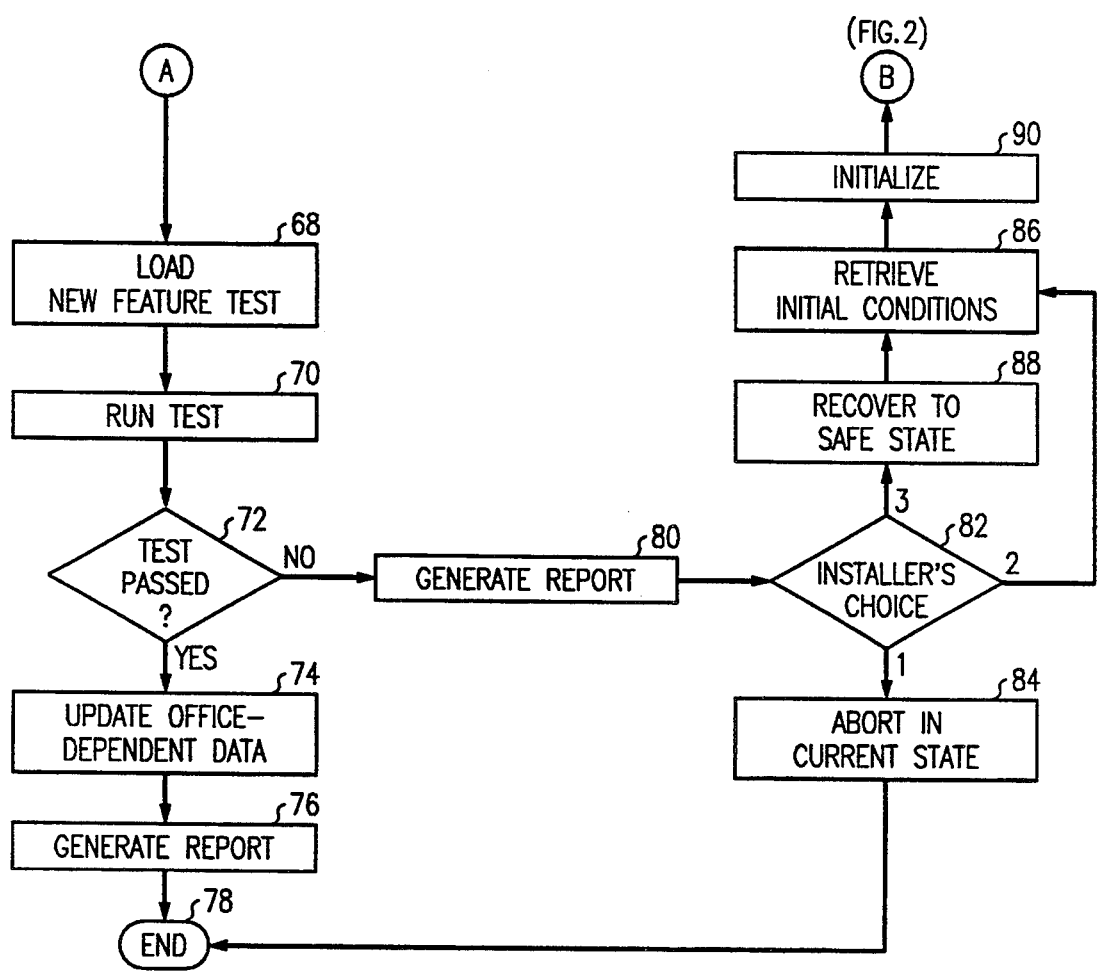

FIGS. 2 and 3 illustrate steps in accordance with the present invention for executing the series of actions used to integrate a new switch feature with the operating system and for testing the new switch feature. In the illustrative embodiment, the steps are executed by an administration module of the telecommunications switch.

Beginning with START 30, the new feature to be installed is identified and selected by craft personnel as indicated in step 32. A new feature may consist of a new feature being added to an existing switch or a new feature may consist of a feature which is to be installed as part of a new switch installation. In step 34 the site specific configuration data of the switch is collected, i.e. data which is specific to the operating parameters of a particular telecommunications switch such as office dependent data is collected. In step 36 a determination is made as to the operational status of the active hardware and operational parameters of the switch. A NO determination results in the generation of a report of the status determination by step 38 and termination of the process at END 40. A YES determination by step 36 results in the initial switch conditions and status data being stored in a temporary file that can be used in the event it is desired to recover to the original state. In step 44 a counter with a variable COUNT is set to "1" and a value N corresponding to the final count (LAST) is read from the file that contains data represented by Table 1. Table 1 provides data utilized by the counter, provides an indication of whether manual action is required or not in conjunction with the step, and installation instructions to be executed.

TABLE 1

| Count | Manual Action | Installation Process for New Feature |
|---|---|---|
| 1 | 0 | Load new feature software |
| 2 | 0 | Initialize new feature software |
| 3 | 0 | Check for presence of required site configuration parameter #1 (P1) |
|  | 1 | If P1 not present, send stored installation prompts |
|  | 0 | If P1 is present, continue |
| . | . | . |
| . | . | . |
| . | . | . |
| N−1 | 0 | Check for presence of required site configuration parameter #N (PN) |
|  | 1 | If PN not present, send stored installation prompts |
|  | 0 | If PN is present, continue |
| N | 0 | Initialize existing O.S. to interact with new feature software |

In step 46 the tuple in Table 1 referenced by variable COUNT is read. In step 48 a determination is made if manual action is required. This determination is made based upon the manual action data corresponding to the COUNT tuple wherein a "0" indicates no manual action required and a "1" indicates manual action is required. In accordance with the present invention, it is desired to minimize the amount of manual action required; however, the installation of new hardware, setting up hardware controlled inputs, and making certain adjustments only permitted to be made manually still requires at least a minimal amount of manual action. Upon a YES determination by step 48, step 50 gives prompts, such as on terminal T0 to craft personnel assisting in the installation, that identify action required and preferably provides specific instructions stored in the data base associated with Table 1 for carrying out the manual installation procedure. In step 52 a determination is made if the required manual action has been completed. Upon a NO determination by step 52, a determination is made in step 54 of whether an appropriate timeout has occurred or if a predetermined event has been reached. The determinations of step 54 are used to end the installation loop should correct action not be obtained within a predetermined period of time or if certain events are reached. The time period of the timeout and predetermined events will vary depending on the specific manual action and will be determined by stored parameters in the file containing Table 2. Upon a YES determination by step 54 a report is generated as indicated in step 56 and the installation process terminates at END 58. A NO determination by step 54 results in a return to step 52 to determine if the action has now been completed. A YES determination by step 52, indicating that the action has been completed, results in the process returning to step 46 to repeat the current step. Following a YES determination by step 52, the step associated with the same COUNT is read as indicated in step 46 and a determination is made in step 48 if manual action is required. As will be explained with regard to an example of Table 1, if the manual action was successfully completed a NO determination will be made by step 48. Following a NO determination by step 48, the indicated step of Table 1 associated with COUNT is performed if the execution of a step is required. In step 62 a determination is made if the variable COUNT is equal to the value of LAST. A NO determination by step 62 indicates that the counter has not reached the predetermined count of LAST and the counter is incremented by "1" as indicated by step 64 and process control again returns to step 46 for consideration of the step associated with the next count. Upon a YES determination by step 62, which indicates that all counts and corresponding actions have been executed, a test procedure for the new feature is loaded as indicated in step 68. A new feature test associated with the new feature to be installed is stored in a data base as represented by Table 2. In Table 2 a series of tuples stores predetermined input parameters indicated by A, B, C, with a corresponding set of output parameters indicated by X, Y, which correspond to conditions T1-T8. These inputs associated with the new feature are utilized and the outputs are observed to see if they match the expected outputs indicated in Table 2.

TABLE 2

| Inputs | | | Outputs | | |
|---|---|---|---|---|---|
| A | B | C | X | Y | Conditions Tested |
| 0 | 0 | 0 | 0 | 0 | Condition T1 |
| 0 | 0 | 1 | 0 | 1 | Condition T2 |
| 0 | 1 | 0 | 0 | 1 | Condition T3 |
| 0 | 1 | 1 | 0 | 0 | Condition T4 |
| 1 | 0 | 0 | 1 | 0 | Condition T5 |
| 1 | 0 | 1 | 1 | 1 | Condition T6 |
| 1 | 1 | 0 | 1 | 1 | Condition T7 |
| 1 | 1 | 1 | 1 | 0 | Condition T8 |

In step 70 the test as represented in Table 2 is run to determine the functionality of the newly installed feature. In step 72 a determination is made if the test was passed. A YES determination by step 72 results in the office dependent data of the switch being updated to reflect the integration of the new switch feature and thereby, makes the feature available for operation at the conclusion of the installation and test procedure. In step 76 a report is generated and the installation terminated as indicated by END 78.

Following a NO determination by step 72 which indicates that the test of the new switch feature was not passed, a report is generated as indicated by step 80 and a determination is made in step 82 based on an installer's choice as to three possible actions. A first choice as indicated in step 84 is to abort the installation procedures in the current state in which the procedure terminates as indicated by END 78. A second choice permits the initial conditions which were previously stored in accordance with step 42 to be retrieved as indicated in step 86. The third choice permits the switch to be recovered to a safe state as indicated by step 88 whereby the switch takes recovery action appropriate for the activity and problem incurred. Following step 86 the switch restores itself to its original starting condition using the data stored at the beginning of the installation process as indicated by step 90. Following step 90 process control returns to step 34.

Referring to Table 1, the tuple associated with COUNT 1 indicates that no manual action is required and the process step to be implemented is the loading of the new feature software. COUNT 2 which also has no manual action required causes the new switch software to be initialized in accordance with the status and conditions of the existing operating system. COUNT 3 is associated with a tuple indicating no manual action and having a process step in which the presence of required a site configuration parameter P1 is checked. A further step associated with this tuple is based on the determination of the check. If P1 is not present, manual action is required and stored installation prompts associated with P1 is sent to the installer as indicated by step 50. If the parameter P1 is present, no manual action is required and no further process step is required, i.e. no determination is made by steps 48 and 62. A series of checks for the presence of required site configuration parameters continues and ends with a check for the parameter of PN as indicated by the tuple associated with the COUNT N−1. The last tuple associated with COUNT N has no manual action required and results in the step of initializing the existing operating system to interact with the new feature software. The data contained in a data base or file as represented by Table 1 is specific to the particular feature to be installed and allows the general processes indicated in FIGS. 2 and 3 to be utilized with differences required for installing different features being accommodated by different data stored in a file represented by Table 1.

Table 2 contains stored data associated with the testing of the new feature and hence, is specific to the particular feature to be tested. For example, in the first tuple input affecting the feature outputs are set: A=0, B=0, C=0. This should result in feature output states of X=0, Y=0, for condition T1. It will be understood that various numbers of inputs and outputs will be required depending upon the particular feature and the conditions required to be tested to achieve a desired confidence factor that the feature will function properly when utilized in normal system operation.

The illustrative embodiment of the present invention facilitates the integration and testing of new software features in a telecommunications switch while minimizing the amount of manual installer support required.

The present invention is suited to the installation of new features in an existing, operational switch, and to the initial installation of a switch in which basic features required of the switch are integrated and tested in accordance with the present invention. Although an exemplary embodiment of the present invention has been described and shown in the drawings, the scope of the invention is defined by the claims which follow.

We claim:

1. In a telecommunications switch including means for establishing communication paths between pairs of subscriber channels, and means for providing operating system (O.S.) control of the switch based on software instructions, an improvement in installing a new switch feature comprising:

said O.S. control means including means operating under the control of software instructions associated with said new switch feature for executing a series of actions to integrate said new switch feature with said O.S. control means;

said O.S. control means including means operating under the control of software instructions for testing the operability of said new switch feature with said telecommunications switch following said series of actions, the integration and testing of said new switch feature implemented by the O.S. control means on which the feature is installed, said executing means comprising means operating under the control of software instructions for determining if switch elements required to support said new switch feature are present and operational prior to the testing by said testing means and inhibiting the execution of said testing if said required elements are not present and operational.

2. The switch according to claim 1 further comprising means responsive to said determining means for providing a prompt perceptible by an installer identifying said element that is unavailable.

3. The switch according to claim 1 further comprising means operating under the control of software instructions for collecting configuration characteristics of said telecommunications switch prior to execution of said actions by said executing means, and means responsive to said testing means for modifying said configuration characteristics to reflect incorporation of said new switch feature following a successful test by said testing means.

4. The switch according to claim 1 wherein said executing means includes means for reading a set of installation instructions that address the installation of a particular switch feature to be installed, said executing means executing said series of actions for installing said particular switch feature in response to said set of installation instructions.

5. The switch according to claim 1 wherein said testing means includes means for reading a set of test conditions that address a particular switch feature to be installed, said testing means testing the operability of said particular switch feature in response to said set of test conditions.

6. The switch according to claim 4 wherein said testing means includes means for reading a set of test conditions that address a particular switch feature to be installed, said testing means testing the operability of said particular switch feature in response to said set of test conditions.

7. In a telecommunications switch including means for establishing communication paths between pairs of subscriber channels, and means for providing operating system (O.S.) control of the switch based on software instructions, a method for installing a new switch feature utilizing said O.S. control means comprising the steps of:

executing, under the control of software installation instructions associated with said new switch feature contained in said O.S. control means, a series of steps that integrate said new switch feature with said operating system;

testing, under the control of software instructions contained in said O.S. control means, operation of said new feature on said telecommunications switch following execution of said series of steps, the integration and testing of said new switch feature carried out by the switch on which the feature is incorporated, said executing step comprising the steps of determining if switch elements required to support said new feature are present and operational prior to the testing step and inhibiting the execution of said testing step if said required elements are not present and operational, said determining and inhibiting steps operating under the control of software instructions contained by said O.S. control means.

8. The method according to claim 7 wherein said executing step comprises the steps of determining if a switch element required to support the new feature is available, and providing a prompt perceptible by an installer identifying an element determined to be unavailable in response to said determining step, said determining and providing steps operating under the control of software instructions contained in said O.S. control means.

9. The method according to claim 7 further comprising the steps of collecting configuration characteristics of said switch prior to execution of said integration steps, and modifying said configuration characteristics to reflect integration of said new switch feature following a successful test by said testing step, said collecting and modifying steps operating under the control of software instructions contained in said O.S. control means.

10. The method according to claim 7 wherein said executing step includes the step of reading a set of installation instructions that address the installation of a particular switch feature to be installed, said executing step executing said series of actions for installing said particular switch feature in response to said set of installation instructions.

11. The method according to claim 7 wherein said testing step includes the step of reading a set of test conditions that address a particular switch feature to be installed, said testing step testing the operability of said particular switch feature in response to said set of test conditions.

12. The method according to claim 10 wherein said testing step includes the step of reading a set of test conditions that address a particular switch feature to be installed, said testing step testing the operability of said particular switch feature in response to said set of test conditions.

* * * * *